(12) United States Patent
Lin et al.

(10) Patent No.: US 6,275,693 B1
(45) Date of Patent: Aug. 14, 2001

(54) METHOD AND APPARATUS FOR PERFORMING BEARER INDEPENDENT WIRELESS APPLICATION SERVICE PROVISIONING

(75) Inventors: Jyh-Han Lin, Coral Springs, FL (US); Nicholas P. Alfano, Vancouver (CA); Steven D. Upp, Barlett, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/444,952

(22) Filed: Nov. 22, 1999

(51) Int. Cl.[7] ................................. H04H 3/20
(52) U.S. Cl. ................ 455/414; 455/422; 455/426; 455/456; 455/461
(58) Field of Search ........................ 455/414, 419, 455/461, 456, 426; 370/338, 401, 402, 403, 404, 405

(56) References Cited

U.S. PATENT DOCUMENTS

| | | | |
|---|---|---|---|
| 5,745,884 | * | 4/1998 | Carnegie et al. ............. 705/34 |
| 5,796,729 | * | 8/1998 | Greaney et al. ............. 370/345 |
| 5,852,721 | * | 12/1998 | Dillon et al. ............. 395/200.47 |
| 5,870,386 | * | 2/1999 | Perlman et al. ............. 370/256 |
| 5,918,022 | * | 6/1999 | Batz et al. ............. 395/200.66 |
| 6,041,166 | * | 3/2000 | Hart et al. ............. 395/200.68 |
| 6,061,346 | * | 5/2000 | Nordman ............. 370/352 |
| 6,061,650 | * | 5/2000 | Malkin et al. ............. 370/401 |
| 6,104,716 | * | 8/2000 | Crichton et al. ............. 370/401 |
| 6,118,785 | * | 9/2000 | Araujo et al. ............. 370/401 |
| 6,137,791 | * | 10/2000 | Frid et al. ............. 370/352 |
| 6,151,628 | * | 11/2000 | Xu et al. ............. 709/225 |
| 6,157,649 | * | 12/2000 | Peirce et al. ............. 370/401 |

* cited by examiner

Primary Examiner—Daniel Hunter
Assistant Examiner—Yemane Woldetatios
(74) Attorney, Agent, or Firm—Scott M. Garrett

(57) ABSTRACT

A mobile communication device (102) communicates over a wireless bearer network which includes a base station (104) and a wireless communication system (108). To provision wireless application services the mobile communication device contacts a provisioning proxy (110) over the wireless bearer network, which in turns contacts a provisioning center (116) over a public network (114). A provisioning tunnel is then established between the provisioning center and the mobile communication device. Once the provisioning tunnel is set up, the user of the mobile communication device can subscribe to, or unsubscribe from wireless application services.

5 Claims, 3 Drawing Sheets

METHOD AND APPARATUS FOR PERFORMING BEARER INDEPENDENT WIRELESS APPLICATION SERVICE PROVISIONING

TECHNICAL FIELD

This invention relates in general to communication systems, and more particularly to mobile wireless communication systems that provide access to wide area public information networks.

BACKGROUND OF THE INVENTION

Recent years have seen a dramatic increase in computer use and computer network use. The public Internet is accessed by many millions of people each day, and the number of people and businesses using the Internet continues to grow at unprecedented rates. Similarly, the number of mobile communication service subscribers has grown as the cost of service has steadily dropped in recent years. It is a foregone conclusion that wireless mobile networking will likewise experience a similar growth.

Wireless mobile networking, or simply mobile networking, allows users to access public and private networks using an air interface between a mobile communication device, such as a so-called smart phone, and a fixed station, such as a base station that is coupled to a mobile network. There are presently scaled down versions of network client software, commonly referred to as browsers, installed in mobile communication devices that permit access to the information made available on public and private networks. There are a variety of network schemes presently in use, including over the air packet data and short messaging service (SMS). In many respects these schemes are similar to regular computer networks in that a network address is used by the mobile communication device, such as Internet protocol (IP) addressing, and the mobile communication device behaves like a network client. However, protocols specifically designed for small, handheld, phone type mobile communication devices are being developed, such as the Wireless Application Protocol (WAP). It is anticipated that such a protocol will become a universal standard.

Using the WAP model, wireless communication and network access via wireless communication are seen as separate roles in wireless mobile communication, much the way an Internet service provider and a local telephone company are used by people to access the internet. A person may have a particular wireless service provider, and use a different company to provide network access for his or her wireless network appliance. Having separate service providers, allows a user to access networks when, for example, they change wireless service providers, or are in an area where their wireless service provider does not provide coverage.

Furthermore, the market interest in multimode wireless communication devices is increasing. Multimode wireless mobile communication devices support more than one type of wireless air interface, and can therefore be used over a broader area. There are a wide variety of air interfaces, such as analog cellular, digital cellular, time division multiple access (TDMA), code division multiple access (CDMA), Global Specification for Mobile communication (GSM), iDEN (integrated Digital Enhanced Network) to name a few. Each of these is referred to as a wireless bearer network. Presently wireless application services are provided on a number of wireless bearer networks, using either circuit data techniques, packet data techniques, or both. Wireless application services includes communication services such as stock price alert weather report, map/direction, directory service, banking, news, etc. Provisioning of these services is done via the wireless bearer network. That is, if wireless application services are provided, the subscriber receives them from the wireless bearer network operator.

Having the wireless bearer network in control of wireless application services is limiting. For one, if a person is roaming on a non-home network, they may not have access to the services since they are not subscribers of that network. Wireless application service providers can be accessed, for example, over the public Internet, but the provisioning of services, if done in a conventional manner, would still be limiting. Therefore there is a need for a method by which wireless application services may be subscribed to and unsubscribed from, as desired by the user of a mobile communication device, and in a manner that works over a variety of wireless bearer networks.

DETAILED DESCRIPTION OF A PREFERRED EMBODIMENT

Figure 1:
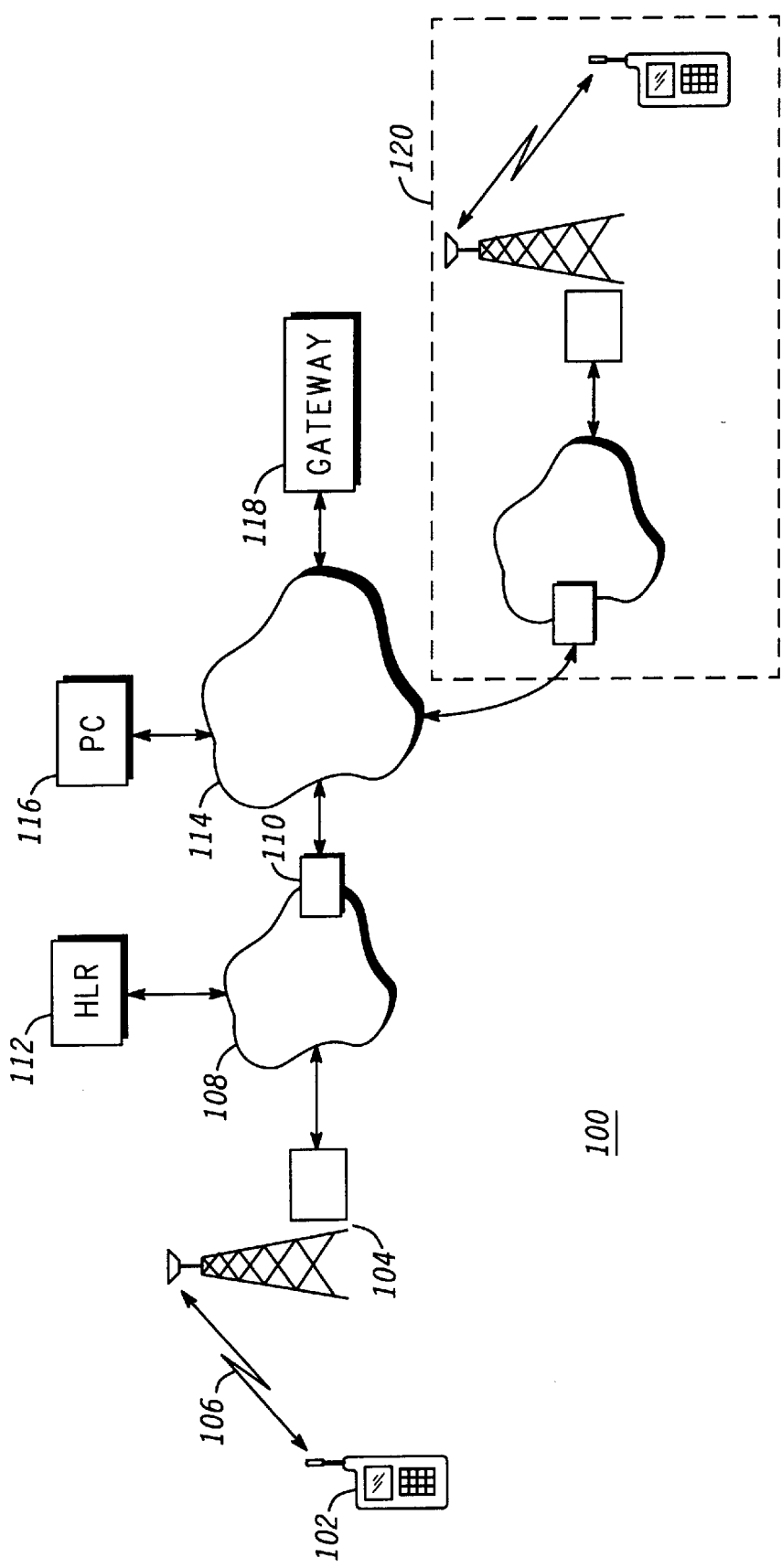
FIG. 1 shows schematic block diagram of a communication system for providing bearer independent wireless application service provisioning, in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention assures that wireless application service provisioning is available to wireless mobile service subscribers, independent of which type of wireless mobile communication service or carrier they are using. The invention provides for a provisioning proxy in the wireless service provider's network that allows the subscriber to set up a connection with a provisioning center that is bearer network independent. The provisioning center is connected to a public network, such as the Internet, and is addresses by conventional means such as internet protocol (IP) addressing. A link is established between the subscriber mobile communication device and the provisioning center via a tunnel, meaning that the communication protocol data is encapsulated in the wireless protocol, over the air interface between the subscriber's mobile communication device and the wireless bearer network. Preferably, a temporary identifier is used initially until the provisioning center assigns a unique identifier to the tunnel. In this way the provisioning center does not need to be aware of the specific wireless bearer information, and can thus operate equivalently regardless of the wireless bearer or bearer type. Once the tunnel between the provisioning center and the mobile communication device is established, the subscriber can subscribe to, or unsubscribe from wireless application services. Since the provisioning center is available over a public network, subscribers can access it from anywhere.

Referring now to FIG. 1, there is shown a schematic block diagram of a communication system 100 for providing bearer independent wireless application service provisioning, in accordance with the invention. A mobile communication device 102 is provided with wireless mobile communication service by a base station 104, using an air interface 106. The base station is part of a wireless communication system 108, such as a cellular communication system. The wireless network may provide, in addition to standard voice communication service, data communication service such as packet data. The base station 104 is operably coupled to a provisioning proxy 110, and a home location register (HLR) 112 through the wireless network 108. By operably coupled it is meant the network entities are coupled via a conventional network, such as an Internet protocol network, for example. The provisioning proxy is a gateway between the wireless network and a public network. Upon activating mobile communication device 102, authentication and registration for wireless service take place in a conventional manner, and typically using the HLR. In addition to the conventional information in the HLR, the HLR also includes a service provisioning control block for each subscriber. The service provisioning control block is a database entry in the subscriber's record, and indicates the public network address of the subscriber's preferred provisioning center. The service provisioning control block contains an international mobile subscriber identifier (IMSI) or some other identifier that is unique to the wireless network, and addressing information for the preferred provisioning center used by the subscriber's wireless application service provider.

The provisioning proxy is a conventional proxy server, and is operably coupled to a network, such as the public Internet 114, to which a wireless network access provisioning center (PC) 116 is also operably coupled. The provisioning center comprises computer and database equipment for provisioning wireless application services. That is, the provisioning center provides an interface between the subscriber and the subscriber's wireless application service provider so that the subscriber can activate new service, change existing service, and so on. More than one wireless application service provider may use a particular provisioning center to allow their customers to control their service subscription. Finally, a wireless application access gateway 118 is operably coupled to the network 114. The gateway is operated by the subscriber's wireless application service provider, much the way a point of presence (POP) gateway is operated by an Internet service provider. Another wireless bearer network is also shown, which uses essentially the same elements as the described in reference to elements 102–112, but may use a different type of air interface. Since the provisioning center is accessible via a public network, there are many wireless bearer networks that can access and share the same provisioning center.

The mobile communication device 102, base station 104, air interface 106, wireless communication system 108, and HLR 112 comprise a means for providing wireless mobile communication. The provisioning proxy is operably coupled to the means for providing wireless mobile communication, and connects it to the means for providing wireless application service provisioning, which includes the provisioning center 116. When the mobile communication device is properly provisioned, the wireless network access gateway provides a access point to the desired network.

To provision wireless application service, the mobile communication device 102, after registering for service with the wireless bearer network, contacts the provisioning proxy 110 through the wireless bearer network, preferably using a data air interface, and requests that a tunnel be set up with the subscriber's preferred wireless application service provider. The provisioning proxy then contacts the HLR and examines the service provisioning control block corresponding to the requesting subscriber to determine the address of the provisioning center. This will include the network address of the provisioning center, such as an IP address. Once that information has been obtained, the provisioning proxy contacts the provisioning center, such as by establishing a TCP/IP connection and a HTTP session with the provisioning center. In the preferred embodiment, the provisioning proxy will use a temporary identifier to identify the requesting mobile communication device for tunnel set up. The provisioning center can resolve any ID collision by looking at the provisioning proxy address, should different provisioning proxies happen to choose the same temporary ID at the same time while contacting the same provisioning center. The provisioning center then assigns a unique ID, such as a WAP service ID, to the provisioning proxy for tunnel identification. It is contemplated that more than one wireless application service provider may use the same provisioning center, in which case the provisioning proxy will indicate which wireless application service provider the requesting mobile communication device is provisioning. At this point the provisioning center and the mobile communication device communicate over the tunnel that is presently set up between the two entities. The tunnel allows the two entities to communicate regardless of the communication protocols and communication bearers between them.

Figure 2:
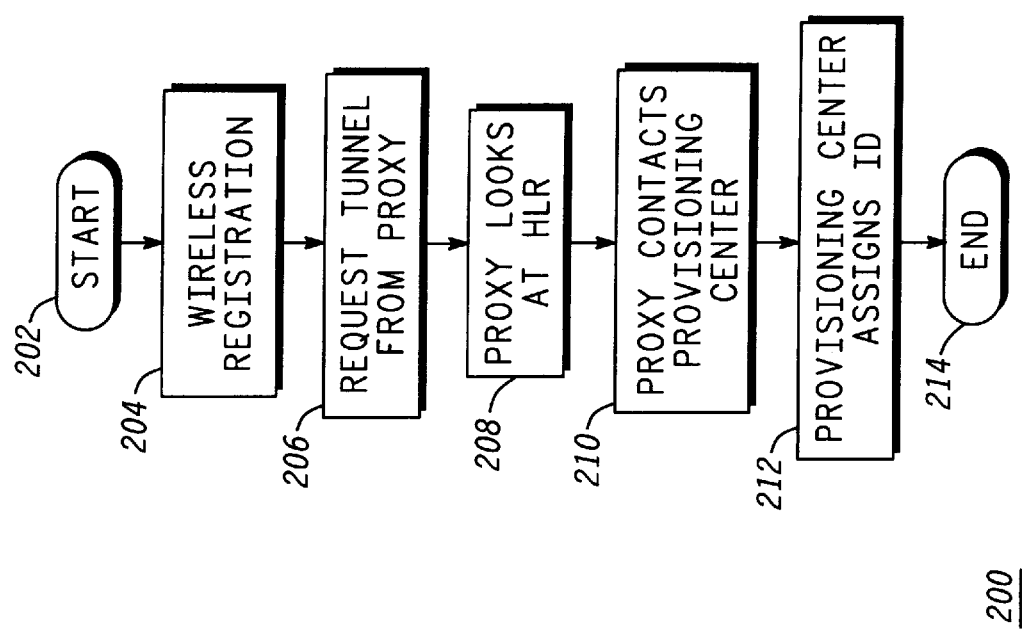
FIG. 2 shows a flow chart diagram of a method for performing wireless application service provisioning for a wireless mobile communication device, in accordance with the invention.

FIG. 2 recaps the method of provisioning wireless application service. Referring now to FIG. 2, there is shown a flow chart diagram 200 of a method for provisioning wireless application service for a wireless mobile communication device, in accordance with the invention. At the start (202), the mobile communication device is powered up by the user, and the user desires to connect to a network in order to, for example, check email or browse files available on the network. If the mobile communication device is not registered for wireless service, the first step is registering for wireless service (204), which is done conventionally, and is a well known process. Once the mobile communication device is registered for wireless service, the mobile communication device contacts the provisioning proxy (206) over the wireless communication system and requests a tunnel to the provisioning center. The provisioning proxy then contacts the HLR (208) to obtain the address of the appropriate provisioning center. This is performed by reading the service provisioning block of the HLR, which is a data field included in the HLR record for the particular mobile communication device making the request, and is in addition to the typical data kept in an HLR. Once the provisioning proxy has the information from the HLR, the provisioning proxy contacts the provisioning center (210) using the temporary tunnel identifier (ID) to identify the requesting mobile communication device. The provisioning center, upon receiving the request, assigns a unique tunnel identifier (212) to identify the requesting mobile communication device, and initiates a tunnel between the mobile communication device and the provisioning center. This accomplishes the bootstrapping for wireless network access. Once the tunnel is established (214) between the provisioning center and the mobile communication device, service can be provisioned, and the mobile communication device can subscribe to or unsubscribe from services the network access provider offers. For example, using the WAP specification, the WAP service set may be negotiated between the mobile communication device and the provisioning center, and the subscriber is billed accordingly. A WAP service set consists of subscription features such as email, Personal Information Management (PIM), chat, news alert, stock alert, location dependent information such as weather forecast, etc. In addition to the provisioning of service, the provisioning center provides the network address of the wireless network access gateway. The security for provisioning can be accomplished using conventional bearer or network security, and is preferably similar to internet secure socket layer or WAP security protocol known as Wireless Transport Layer Security (WTLS).

Figure 3:
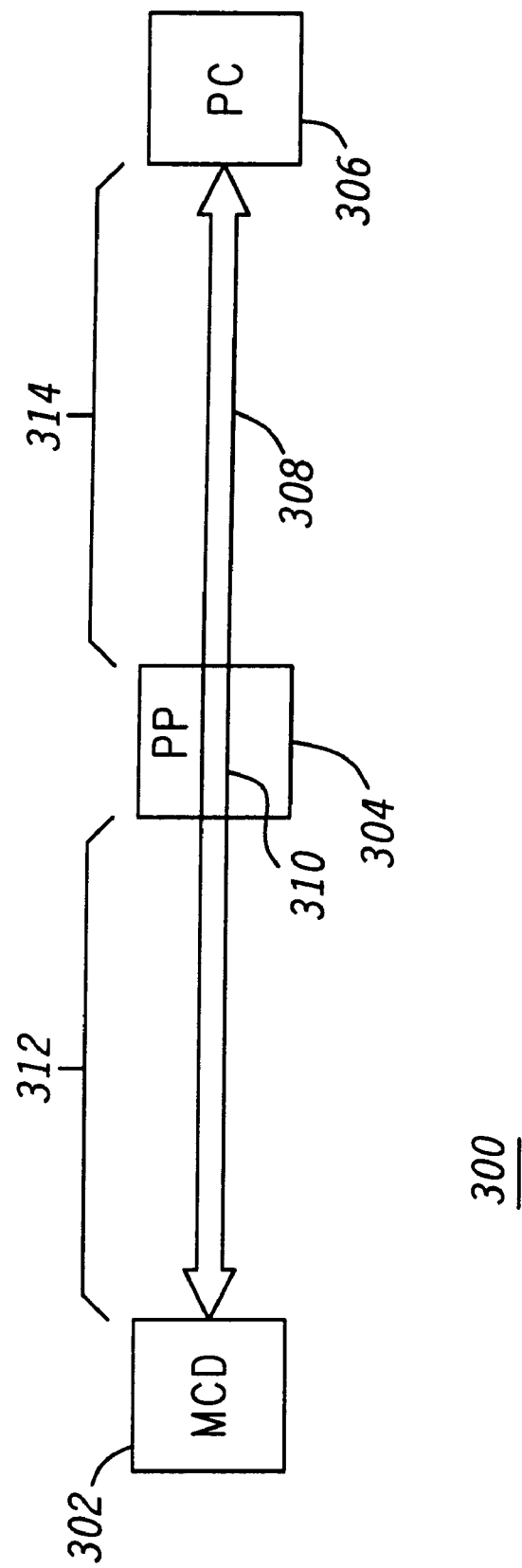
FIG. 3 shows a graphical representation of a provisioning tunnel established between a provisioning center and a mobile communication device over a wireless service bearer, in accordance with the invention.

Referring now to FIG. 3, there is shown a graphical representation of a provisioning tunnel 300 established between a provisioning center 306 and a mobile communication device 302 over a wireless service bearer 312, in accordance with the invention. FIG. 3 represents the state of the communication link between the mobile communication device and the provisioning center at step 214 of FIG. 2. The provisioning tunnel 308 is established from the mobile communication device 302 to the provisioning proxy 304 over the wireless bearer network 312 for that portion of the tunnel. The bearer network may be a wireless circuit data connection, a wireless packet data connection, and so on, as is known in the art. Between the provisioning proxy and the provisioning center 306 the tunnel is carried over, for example, a TCP/IP network 314.

Thus, by establishing a data tunnel between the provisioning center and the mobile communication device, the provisioning can be done independent of the particular wireless bearer network, and wireless communication system. This allows a user to access, for example, the Internet through a preferred access provider, regardless of which specific wireless mobile communication system is used, and in the case where the user changes access service providers.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for performing wireless application service provisioning for a mobile communication device, the mobile communication device operating over a wireless mobile communication system, the method comprising:

requesting a provisioning tunnel between the mobile communication device and a provisioning center, the request being communicated to a provisioning proxy, the provisioning proxy being part of the wireless mobile communication system;

forwarding the request for a provisioning tunnel from the provisioning proxy to a provisioning center over a public network;

generating a tunnel identifier to be associated with the mobile communication device, including generating a temporary identifier at the provisioning proxy; and establishing the provisioning tunnel from the provisioning center to the provisioning proxy using the tunnel identifier.

2. A method of performing wireless application service provisioning as defined in claim 1, further comprising obtaining the provisioning center network address from a home location register.

3. A method of establishing a provisioning tunnel between a mobile communication device and a provisioning center, the mobile communication device operably coupled to a wireless bearer network over an air interface, the provisioning center operably coupled to a public network, the method comprising:

transmitting a request or the provisioning tunnel from the mobile communication device t o a provisioning proxy over the wireless bearer network;

obtaining the network address of the provisioning enter from a home location register operably coupled to the wireless bearer network;

forwarding the request to the provisioning center over the public network; and establishing a communication session between the provisioning proxy and the provisioning center, and the provisioning proxy and the mobile communication device, including transmitting a session identifier to the provisioning proxy from the provisioning center.

4. A method of establishing a provisioning tunnel as defined in claim 3, wherein obtaining comprises obtaining the network address from the mobile communication device.

5. A method of establishing a provisioning tunnel as defined in claim 3, wherein forwarding the request includes forwarding a first identifier to the provisioning center.

* * * * *